(12) United States Patent
Takayanagi

(10) Patent No.: US 6,669,368 B2
(45) Date of Patent: Dec. 30, 2003

(54) SPINDLE MOTOR AND BEARING ASSEMBLY

(75) Inventor: Shin-ichi Takayanagi, Miyota-machi (JP)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 09/861,646

(22) Filed: May 22, 2001

(65) Prior Publication Data
US 2002/0101123 A1 Aug. 1, 2002

(30) Foreign Application Priority Data
Jan. 31, 2001 (JP) ........................................ 2001-024026

(51) Int. Cl.⁷ .............................................. F16C 32/04
(52) U.S. Cl. ......................... 384/100; 384/107; 384/112
(58) Field of Search ................................. 384/100, 107, 384/108–120, 295, 296, 428; 360/99.04, 99.08

(56) References Cited

U.S. PATENT DOCUMENTS

| | | | |
|---|---|---|---|
| 4,607,182 A | | 8/1986 | Ballhaus ...................... 310/90 |
| 4,620,805 A | * | 11/1986 | Belanger ..................... 384/257 |
| 4,713,704 A | | 12/1987 | Voll et al. ..................... 360/97 |
| 5,135,314 A | * | 8/1992 | Momose et al. ............ 384/275 |
| 5,341,569 A | | 8/1994 | Takamizawa et al. .... 29/898.09 |
| 5,399,025 A | * | 3/1995 | Higuchi et al. .......... 29/898.07 |
| 5,426,548 A | * | 6/1995 | Fujii et al. ............... 360/98.08 |
| 5,509,198 A | | 4/1996 | Takamizawa et al. .... 29/898.09 |
| 5,634,724 A | | 6/1997 | Zang et al. .................. 384/107 |
| 5,658,080 A | * | 8/1997 | Ichiyama ..................... 384/112 |
| 5,659,445 A | * | 8/1997 | Yoshida et al. ............... 310/90 |
| 5,707,154 A | * | 1/1998 | Ichiyama ..................... 384/107 |
| 5,791,784 A | * | 8/1998 | Ichiyama ..................... 384/107 |
| 5,941,644 A | * | 8/1999 | Takahashi ................... 384/112 |
| 6,016,238 A | * | 1/2000 | Yoshikawa et al. ...... 360/98.07 |
| 6,055,126 A | * | 4/2000 | Kennedy et al. ......... 360/99.08 |
| 6,271,612 B1 | * | 8/2001 | Tanaka et al. ................ 310/90 |

FOREIGN PATENT DOCUMENTS

EP 0 938 088 A2 2/1999

* cited by examiner

Primary Examiner—David A. Bucci
Assistant Examiner—Julie K. Smith
(74) Attorney, Agent, or Firm—Lorusso, Loud & Kelly

(57) ABSTRACT

The fixed shaft type spindle motor of the invention has a fixed shaft extending from a base and a rotor hub rotatably supported thereon through a bearing. Where the bearing is a compound ball bearing, a larger diameter portion of a stepped connection member is fixed within the upper end of the outer ring of the compound ball bearing and a smaller diameter portion of the connection member is fixed to the rotor hub. The rotary shaft type spindle motor has a rotary shaft extending within the rotor hub, and the rotary shaft is rotatably supported through the bearing, with the larger diameter portion of the connection member fixed within the lower end of the outer ring of the compound ball bearing and the smaller diameter portion of the connection member fixed to the base.

9 Claims, 11 Drawing Sheets

SPINDLE MOTOR AND BEARING ASSEMBLY

BACKGROUND OF THE INVENTION

1. Field of the Invention

The present invention relates to a spindle motor and a bearing assembly for use in office automation equipment such as a computer and peripheral equipment thereof as a driving device/component for the rotating mechanism thereof, specifically to the spindle motor and the bearing assembly to enhance the run-out accuracy/nonrepeatable runout (NRRO) of a motor, and reliability, low noise, acoustic life, and rigidity, etc.

2. Description of the Prior Art

Spindle motors for driving a magnetic disk, e.g., a hard disk drive as a peripheral device of a computer, are classified broadly into two types in terms of the structure: the fixed shaft type in which a fixed shaft is installed upright on a base, and a rotor hub is supported to freely rotate on the fixed shaft through a bearing interposed between the fixed shaft and the rotor hub; and the rotary shaft type in which a rotary shaft is vertically installed on a rotor hub, and the rotary shaft is supported to freely rotate on a base through a bearing interposed between the rotary shaft and the base.

Generally, the fixed shaft type is provided with, as shown in FIG. 9, a base (flange) 02, a fixed shaft 010 that is installed upright on the base 02, a rotor hub (hub member) 03 that rotates relative to the base 02, and a bearing means 04 interposed between the fixed shaft 010 and the rotor hub 03. A recording medium such as a magnetic disk (not shown) is mounted on the rotor hub 03. A stator 015 is installed on the outer peripheral surface of an inner cylindrical wall 014 of the base 02, and a permanent magnet 016 is installed on the inner peripheral surface of an outer circumferential wall 013 of the rotor hub 03 so as to face the outer peripheral surface of the stator 015. A feeder 017 feeds current to the windings of the stator 015 and is connected to a flexible printed circuit board 037.

The bearing means 04 is a compound ball bearing, and an inner ring 06 thereof is fixed to the outer surface of the fixed shaft 010, and an outer ring 05 thereof is fixed to the inner peripheral surface of an inner circumferential wall 032 of the rotor hub 03. A part of the inner ring 06 can be formed integrally with the fixed shaft 010 according to circumstances, as shown in FIG. 9; and the outer ring 05 can be formed integrally with the whole structure of the compound ball bearing in certain cases, as shown in the same figure.

The rotary shaft type is also provided with, as shown in FIG. 10, the base (flange) 02, the rotor hub (hub member) 03 that rotates relative to the base, a rotary shaft 020 that is vertically installed on the rotor hub 03, and the bearing means 04 interposed between the rotary shaft 020 and the base 02. The recording medium such as a magnetic disk (not shown) is mounted on the rotor hub 03. The stator 015 is installed on the outer peripheral surface of the inner cylindrical wall 014 of the base 02, and the permanent magnet 016 is installed on the inner peripheral surface of the outer circumferential wall 013 of the rotor hub 03 so as to face the outer peripheral surface of the stator 015. The symbol 017 denotes the feeder for feeding current to the windings of the stator 015, which is connected to a flexible printed circuit board 037.

The bearing means 04 is a compound ball bearing, and the inner ring 06 thereof is fixed to the outside to the rotary shaft 020, and the outer ring 05 thereof is fixed to the inner peripheral surface of the cylindrical wall 014 of the base 02. A part of the inner ring 06 can be formed integrally with the rotary shaft 020 according to circumstances, as shown in FIG. 10; and the outer ring 05 can be formed integral with the whole structure of the compound ball bearing in certain cases, as shown in the same figure.

In a certain case, the rotor hub 03 and the rotary shaft 020 each manufactured separately can be assembled into a unit, as shown in FIG. 10; and in another case, they can be manufactured as an integral unit from the beginning. In the latter case, a part of the inner ring 06 cannot be formed integrally with the rotary shaft 020.

In any type of the spindle motor 01, the rotor hub 03 thereof is supported on the base 02 to freely rotate through the compound ball bearing 04 as a rolling bearing interposed between the base 02 and the rotor hub 03. And, the inner ring 06 of the compound ball bearing 04 is fixed to the outside of the fixed shaft 010 vertically installed on the base 02 or to the rotary shaft 020 vertically installed on the rotor hub 03. The outer ring 05 thereof is fixed to the inner peripheral surface of the inner circumferential wall 032 of the rotor hub 03 or to the inner peripheral surface of the inner cylindrical wall 014 of the base 02.

Now, recent demands of the hard disk drive show a remarkable tendency toward increase in the recording capacity, to enhance the impact resistance, to lower the noises, to increase the data access speed, and so forth. In order to answer these requirements, the roller bearing of a spindle motor has gone through improvements in the material composition, enhancements of the precision of the inner and outer rings and rolling elements, etc.

However, when the inner and outer rings and the balls (rolling elements) are made of steel such as bearing steel, metal-to-metal contact occurs between the rolling surfaces of the inner and outer rings and the surfaces of the balls, which contact effects galling and wear to deteriorate the acoustic characteristic, leading to a problem in the acoustic life (recently, the life of the spindle motor is evaluated not by the fatigue life, but by the acoustic life). Further, fretting corrosions (impressions, dilapidated surfaces) form on the rolling surfaces due to shocks and vibrations during transportation, which also deteriorates the acoustic life and the precision of rotation.

Especially in recent years, the rotational speed of a spindle motor is increased to higher than 7200 rpm, and the sound of rotation of the motor becomes increased to that degree, which tends to shorten the acoustic life. Also, in the future, a need for still further increase of the recording capacity is estimated in view of the demand for recording video images and so forth. In order to answer such demands and estimated future problems, the foregoing improvements in the material composition and enhancements of the working precision and the like will not be sufficient.

In recent years, ball materials have been tested and examined which exceed in the non-agglutination property and in wear resistance, and nitride silicon ceramics have been adopted as the rolling element material. There have been discussions about the limitation of the rolling bearing itself, including the ceramic ball bearing made of such new materials, and employment of a fluid bearing has been suggested as a solution to these problems.

FIG. 11 illustrates a rotary shaft type spindle motor 01 with such a fluid bearing. This spindle motor 01 is provided with a base (flange) 02, a rotor hub (hub member) 03 that rotates relative to the base 02, a rotary shaft 020 that is vertically installed on the rotor hub 03, and a fluid bearing 030 interposed between the rotary shaft 020 and the base 02.

A sleeve 031 of the fluid bearing 030 sheathes the rotary shaft 020, and is fixed to the inner peripheral surface of the inner cylindrical wall 014 of the base 02. Lubricating oil is supplied into the sliding area between the sleeve 031 and the rotary shaft 020, and herringbones (<-shaped grooves) 033 formed on the circumferential surface of the rotary shaft 020 raise the pressure of the lubricating oil, with the rotation of the rotary shaft 020, which floats the rotary shaft 020 up in the sleeve 031.

Although not detailed in the drawing, similar herringbones are formed on an edge surface of a thrust ring 034 fixed to a lower part of the rotary shaft 020, and lubricating oil is supplied into a gap between the edge surface and an inner surface of a counter plate 037 fixed to the lower end of the sleeve 031. As the rotary shaft 020 turns, the herringbones raise the pressure of the lubricating oil, which makes the counter plate 037 receive the thrust that acts on the rotary shaft 020.

Therefore, the base 02 supports the rotary shaft 020 of the rotor hub 03 for free rotation through the fluid bearing 030 interposed therebetween. The other structure of the motor is basically identical to the spindle motor having the compound ball bearing.

On the other hand, in the fixed shaft type spindle motor with a fluid bearing, which is not illustrated, the sleeve 031 of the fluid bearing 030 is fit to an inner peripheral surface of a wall formed on the rotor hub 03, and a fixed shaft is installed upright on the base 02 and sheathed with the sleeve 031. Therefore, the fixed shaft supports the rotor hub 03 to allow free rotation through the fluid bearing 030 interposed therebetween.

Regardless of whether a ball bearing or a fluid bearing is used, and regardless of whether the spindle motor is a fixed shaft type or a rotary shaft type, the installation of the bearing in the spindle motor is carried out by one of the following methods: press-fitting to the counterpart (rotating components and fixed components), adhesion by adhesives, and press-fit adhesion using both of these.

In case of the press fitting method, the precision of the shape (circularity, cylindricality, surface roughness) of the inner or outer peripheral surface of the counterpart influences the shape from the outer peripheral surface of the outer ring and the inner peripheral surface of the inner ring of the rolling bearing which influence is transferred to the rolling surfaces of the inner and outer rings, i.e., deformation of the rolling surfaces of the inner and outer rings. Also, the external stress caused by press fitting propagates through the outer peripheral surface of the outer ring or through the inner peripheral surface of the inner ring, and produces permanent deformations on the rolling surfaces of the inner and outer rings through the rolling elements to form impressions thereon, which reduces the reliability of the run-out accuracy/NRRO, and the acoustic life, etc., of the motor. In the fluid bearing, the clearance between the sleeve and the shaft varies, which varies the rigidity.

In using an adhesive, stress is produced when the adhesive hardens, which deforms the bearing, also damaging the reliability of the run-out accuracy, increasing noise, and reducing the acoustic life of the motor, and so forth. Further, in the rotary shaft type spindle motor, the assembly of the stator 015 on the outer peripheral surface of the cylindrical wall 014 of the base 02 reduces the accuracy of the inner diameter of the cylindrical wall 014, which, in turn, reduces the bearing precision.

Further, in case of the foregoing press-fitting, adhesion, and press-fit adhesion methods for mounting the bearing, an adhesion groove (refer to adhesion groove 040 in FIG. 9, adhesion groove 041 in FIG. 10) for introducing the adhesive and a run-off groove are needed on the bearing mounting surface on the side of the counterpart, which require additional time (man-hours), leading to a cost increase.

SUMMARY OF THE INVENTION

The present invention has been made in view of the foregoing problems, and it is an object of the invention to provide a spindle motor and a bearing assembly that resolve the foregoing problems of the conventional spindle motor, and that remove adverse influences of stress on the precision of the rolling surfaces of the inner and outer rings through the outer peripheral surface of the outer ring and the inner peripheral surface of the inner ring of the bearing. In other words, the object is to reduce the effect of stress on shape precision (circularity, cylindricality, surface roughness) of the inner or outer peripheral surface of the counterpart, which stress is created in mounting the bearing by press-fitting, adhesion, or press-fit adhesion, and to thereby enhance the reliability of the run-out accuracy/NRRO, reduce the noise, and prolong the acoustic life, etc., of the spindle motor, and to reduce the manufacturing cost thereof.

According to the first aspect of the invention, the spindle motor is a fixed shaft type spindle motor in which a fixed shaft is vertically supported on a base and a rotor hub is supported for free rotation by the fixed shaft through a bearing which is a compound ball bearing, with a larger diameter portion of a connection member fixed within an end of an outer ring of the compound ball bearing, and a smaller diameter portion of the connection member fastened to the rotor hub. Thus, the outer ring of the compound ball bearing is fastened to the rotor hub through the connection member.

As a result, the rotor hub (the component on the rotating side) being one of the two counterparts (a component on the rotating side and a component on the fixing side) that have the compound ball bearing mounted therebetween can omit the inner peripheral wall which has conventionally been regarded as necessary for fitting the outer ring of the compound ball bearing thereto. Therefore, the stress otherwise resulting from the shape precision (circularity, cylindricality, surface roughness) of the inner peripheral surface of the wall, and the stress caused by the press-fitting, adhesion, or press-fit adhesion mounting of the bearing are eliminated. Accordingly, adverse influences on the precision of the rolling surfaces of the inner and outer rings through the outer peripheral surface of the outer ring of the bearing are eliminated, thereby enhancing the reliability of the run-out accuracy/NRRO, the noises, and the acoustic life, etc., of the spindle motor.

Further, since the rotor hub can be configured without the inner peripheral wall, which has conventionally been regarded as necessary for fitting the outer ring of the compound ball bearing thereto, the adhesion groove (the groove for filling adhesives) and the run-off groove that are conventionally formed on the inner peripheral surface of the wall become unnecessary, thereby reducing the man-hours and manufacturing cost.

According to the second aspect of the invention, the compound ball bearing is substituted with a fluid bearing, with the larger diameter portion of the connection member fixed within an end of a sleeve of the fluid bearing, and the smaller diameter portion of the connection member fastened to the rotor hub. Thus, the sleeve of the fluid bearing is fastened to the rotor hub through the connection member.

Also with use of a fluid bearing, the inner peripheral wall, which has conventionally been regarded as necessary for fitting the sleeve of the fluid bearing thereto, may be eliminated, along with the aforementioned stresses. Accordingly, adverse influences on the precision of the sliding surfaces of the sleeve and the fixed shaft and on the clearance therebetween are eliminated, thereby enhancing the reliability of the run-out accuracy/NRRO, the noises, the acoustic life, and the rigidity, etc., of the spindle motor.

Further, since the inner peripheral wall, which has conventionally been regarded as necessary for fitting the sleeve of the fluid bearing thereto, is omitted, the adhesion groove and the run-off groove that are conventionally formed on the inner peripheral surface of the wall become unnecessary, thereby reducing the man-hours and the manufacturing cost.

According to a third aspect of the invention, there is provided a rotary shaft type spindle motor in which a rotary shaft is fixed to a rotor hub and the rotary shaft is supported for freely rotating through a bearing, wherein the bearing is a compound ball bearing. A larger diameter portion of a stepped connection member is fixed within an end of an outer ring of the compound ball bearing, and a smaller diameter portion of the connection member is fixed to the base. Thus, the outer ring of the compound ball bearing is fastened to the base through the connection member.

As a result, the base (the component on the fixed side) being the one of the two counterparts (the component on the rotating side and the component on the fixed side) that mount the compound ball bearing therebetween can be made without the inner peripheral wall, which has conventionally been regarded as necessary to fit the outer ring of the compound ball bearing thereto. Therefore, the stress resulting from the shape precision (circularity, cylindricality, surface roughness) of the inner peripheral surface of the wall and the stress caused by the press-fitting, adhesion, or press-fit adhesion method of mounting the bearing are eliminated. Accordingly, adverse influences on the precision of the rolling surfaces of the inner and outer rings through the outer peripheral surface of the outer ring of the bearing are eliminated, thereby enhancing the reliability of the run-out accuracy/NRRO, the noises, and the acoustic life, etc., of the spindle motor.

Further, since the inner peripheral wall, which has conventionally been regarded as necessary for fitting the outer ring of the compound ball bearing thereto, is eliminated, the adhesion groove and the run-off groove that are conventionally formed on the inner peripheral surface of the wall become unnecessary, thereby reducing the man-hours and the manufacturing cost.

In a fourth aspect of the invention, the compound ball bearing of the third aspect is replaced with a fluid bearing, with a larger diameter portion of the stepped connection member fixed within an end of a sleeve of the fluid bearing, and the smaller diameter portion of the connection member fastened to the base. Thus, the sleeve of the fluid bearing is fastened to the base through the connection member.

As a result, in the fourth aspect also, the aforementioned stresses are eliminated and, accordingly, adverse influences on the precision of the sliding surfaces of the sleeve and the fixed shaft and on the clearance between the sliding surfaces of the two are eliminated, thereby enhancing the reliability of the run-out accuracy/NRRO, the noise, the acoustic life, and the rigidity, etc., of the spindle motor.

Further, in the fourth aspect also, because the inner peripheral wall, which has conventionally been regarded as necessary for fitting the sleeve of the fluid bearing thereto, is eliminated, the adhesion groove and the run-off groove can also be eliminated, thereby reducing the man-hours and lowering the manufacturing cost.

BRIEF DESCRIPTION OF THE DRAWINGS

Preferred embodiments of the present invention will be described with reference to the accompanying drawings.

DESCRIPTION OF THE PREFERRED EMBODIMENTS

The first embodiment of the invention will be described with reference to FIG. 1 and FIG. 2.

Figure 1:
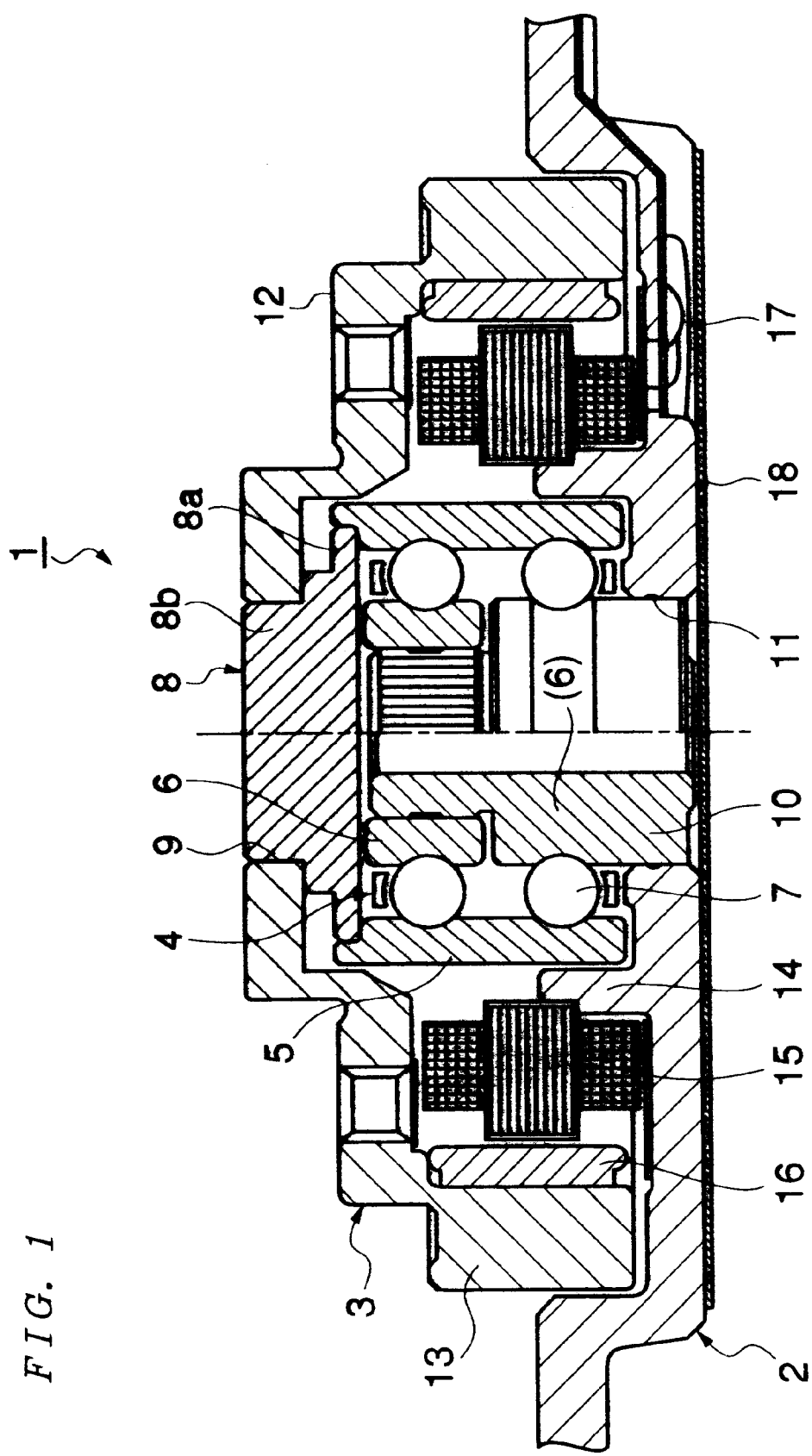
FIG. 1 is a sectional view of a fixed shaft type spindle motor according to the first embodiment of the invention.
Figure 2:
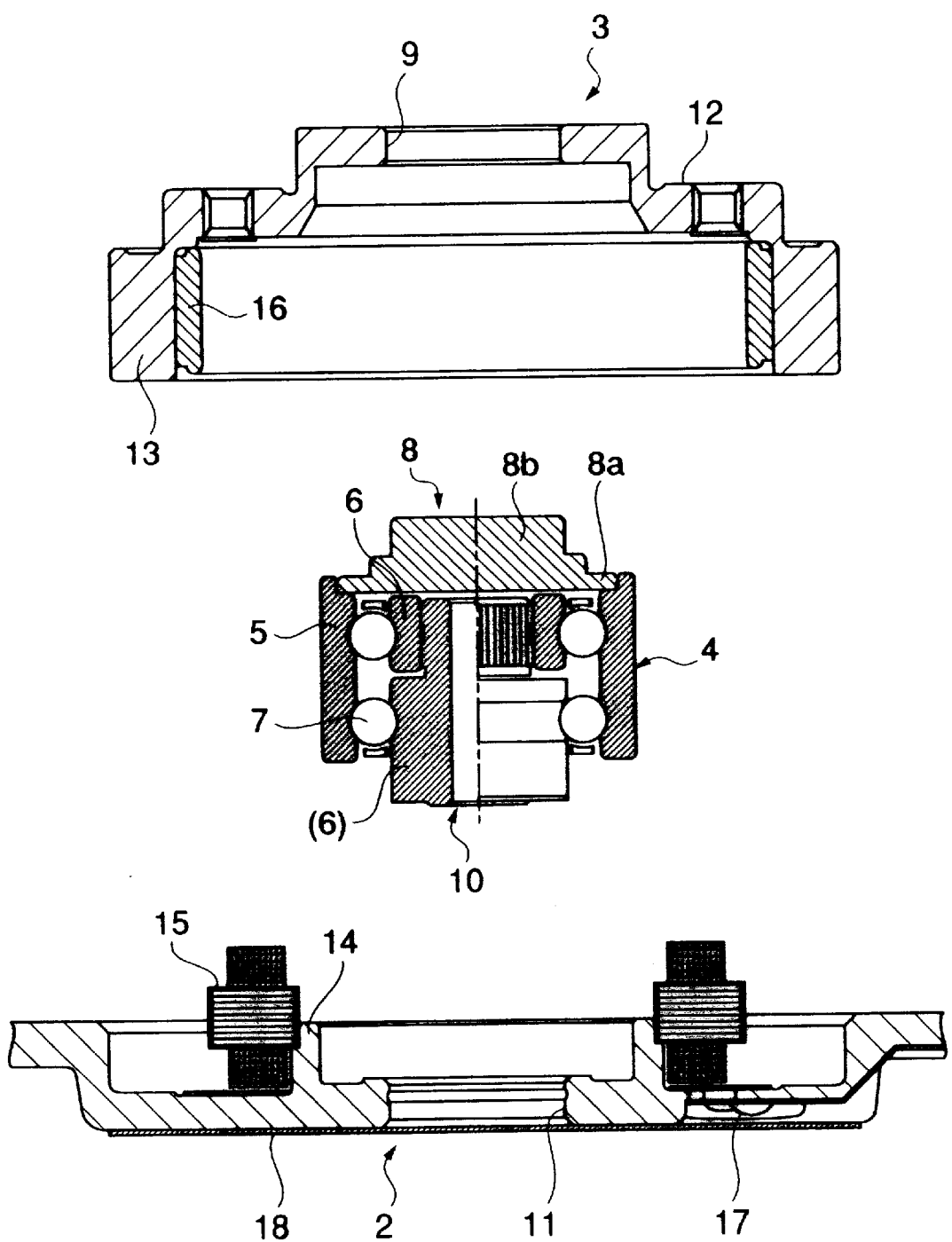
FIG. 2 is an exploded view of the spindle of FIG. 1.

As shown in FIG. 1 and FIG. 2, the fixed shaft type spindle motor 1 of the first embodiment has a fixed shaft 10 installed upright (vertically upward) on a flange base 2, in which the fixed shaft 10 is fixed within a central circular hole 11 in the flange base 2. An inner ring 6 of an upper half portion of a compound ball bearing 4 is fixed to the upper reduced diameter portion of the fixed shaft 10. The inner ring portion (6) of the lower half of the compound ball bearing 4 is formed integrally with the fixed shaft 10.

An outer ring 5 of the compound ball bearing 4 is an integral structure which extends over the whole length of the compound ball bearing 4. On the upper end of the outer ring 5 is formed a step portion having an enlarged inner diameter. A larger diameter portion 8a of a stepped connection member 8 (also having a smaller diameter portion 8b) is fixed within the step formed in the upper end of the outer ring 5. The smaller diameter portion 8b of the connection member 8 is fixed withing a central circular hole 9 of a rotor hub 3.

Figure 9:
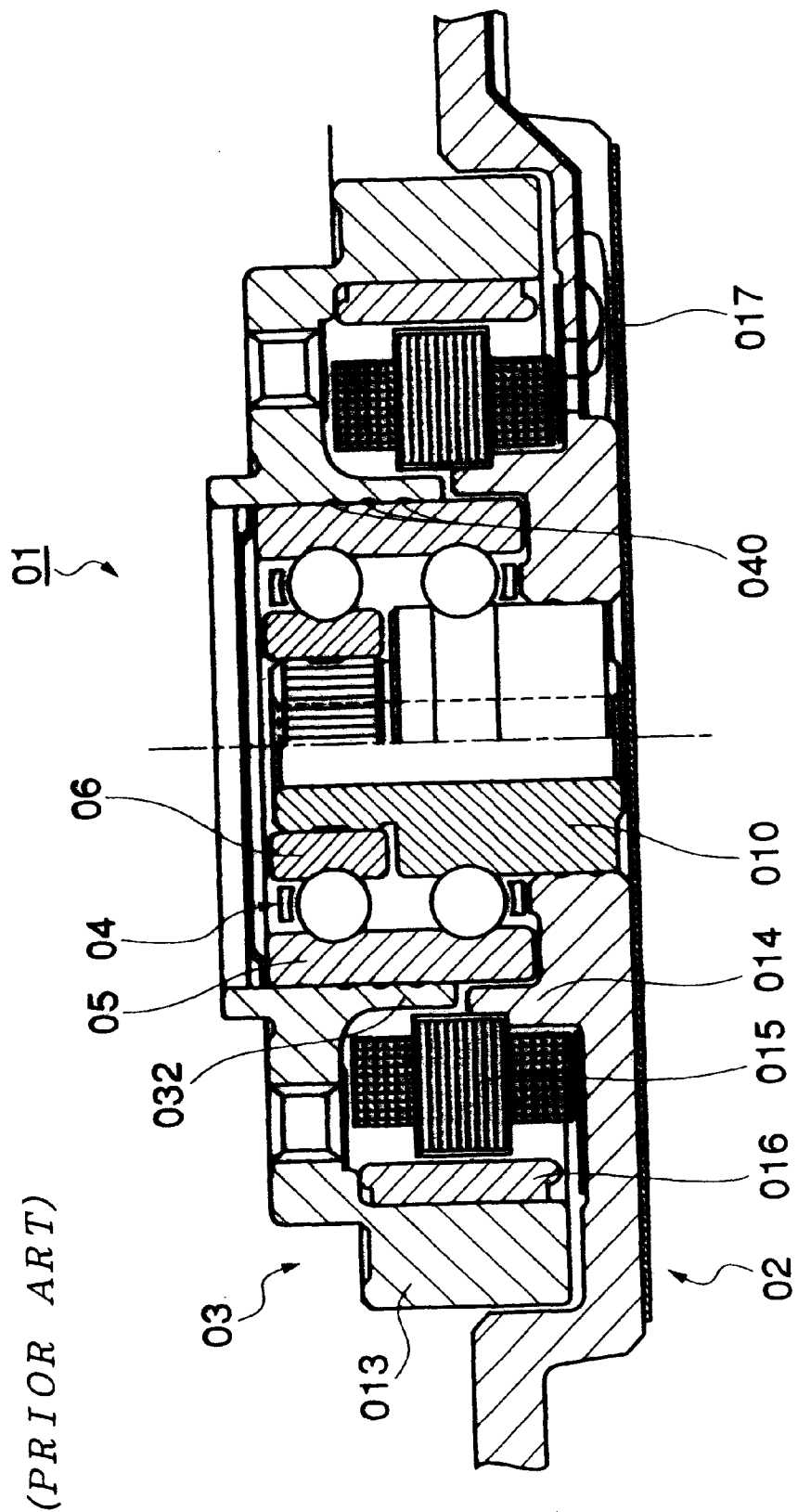
FIG. 9 is a sectional view of a conventional fixed shaft type spindle motor using a compound ball bearing.

Therefore, since the rotor hub 3, connection member 8, and the outer ring 5 of the compound ball bearing 4 are coupled together into a single unit, the rotor hub 3 is supported for free rotation by the fixed shaft 10 through the connection member 8 and the compound ball bearing 4. Because the outer ring 5 of the compound ball bearing 4 is fixed to the rotor hub 3 through the connection member 8, an inner peripheral wall (refer to the inner peripheral surface of the inner circumferential wall 032 of the rotor hub 03 in FIG. 9), which has conventionally been regarded as necessary to secure the outer ring 5 of the compound ball bearing 4 to the rotor hub 3, becomes unnecessary and is omitted.

A magnetic disk (not shown) is mounted on a mounting surface 12 of the rotor hub 3. The other rotating bodies requiring a high run-out accuracy/NRRO and/or low noise can be mounted thereon.

Plural balls (rolling elements) 7 are accommodated between the outer ring 5 and the inner ring 6, which are arrayed around the circumference in a vertical two-stage configuration. The balls 7 travel on concave rolling surfaces that are formed facing each other on the inner peripheral surface of the outer ring 5 and on the outer peripheral surface of the inner ring 6.

A stator 15 is fitted around the outer peripheral surface of an inner cylindrical wall 14 of the base 2, and a permanent magnet 16 is mounted around the circumference on the inner peripheral surface of an outer circumferential wall 13 of a larger diameter portion of the rotor hub 3, facing the outer peripheral surface of the stator 15. A feeder 17 connects the windings of the stator 15 to a flexible printed circuit board 37. The symbol 18 denotes a plaque.

In the first embodiment, the fixed shaft 10, the compound ball bearing 4, and the connection member 8 are integrally assembled in advance as a unit, as shown in FIG. 2. With the bearing assembly thus assembled, the projecting end of the fixed shaft 10 is fixed within the central circular hole 11 of the base 2, and the smaller diameter portion 8*b* of the connection member 8 is fixed withing the central circular hole 9 of the rotor hub 3, whereby the fixed shaft type spindle motor 1 of the first embodiment is completed.

When power is supplied from the feeder 17 connected to the flexible printed circuit board 37 to the windings of the stator 15, according to the operating principle of the synchronous motor, the rotor hub 3 with the permanent magnet 16 starts to rotate as one body with the connection member 8 and the outer ring 5. That is, the rotor hub 3 is borne by the compound ball bearing 4 through the connection member 8 to rotate about the fixed shaft 10.

The rotor hub 3 is one of the two counterparts, the rotor hub 3 being the component on the rotating side and the base 2 being the component on the fixed side. Because the compound ball bearing 4 eliminates need for the inner wall, which has conventionally been regarded as necessary for fitting the outer ring 5 of the compound ball bearing 4 to the rotor hub 3, the stress resulting from faults in the shape precision (circularity, cylindricality, surface roughness) of the inner peripheral surface of the wall, and the stress caused by the mounting of the bearing are eliminated. Accordingly adverse influences on the precision of the rolling surfaces of the inner and outer rings 6, 5 through the outer peripheral surface of the outer ring 5 of the compound ball bearing 4 are eliminated, so that the reliability of the run-out accuracy/NRRO, the noises, and the acoustic life, etc., of the spindle motor 1 can be enhanced.

Further, because the rotor hub 3 is one of the two counterparts connected through the compound ball bearing 4 omits the inner wall which has conventionally been regarded as necessary for fitting the outer ring 5 of the compound ball bearing 4 to the rotor hub 3, the adhesion groove for introducing adhesive and the run-off groove that are conventionally formed on the inner peripheral surface of the wall become unnecessary, which reduces man-hours and lowers the manufacturing cost.

Further, since the compound ball bearing 4, the fixed shaft 10, and the connection member 8 are assembled in advance into one unit, fastening the fixed shaft 10 to the base 2 and fastening the smaller diameter portion 8*b* of the connection member 8 to the rotor hub 3 will serve to assemble the compound ball bearing 4 between these two counterparts, thus the work of mounting the compound ball bearing 4 becomes extremely easy to perform.

Since the inner ring portion (6), which is on the lower half of the two unit ball bearing portions constituting the compound ball bearing 4, is formed integrally with the fixed shaft 10, assembling the compound ball bearing 4, the fixed shaft 10, and the connection member 8 in advance into one assembly unit will produce a still greater advantage. If these components were not assembled in advance, mounting the compound ball bearing 4 on the fixed shaft 10 with the inner ring portion (6) integrally formed thereon would lead to a troublesome procedure involving insertion of the balls (rolling elements) 7 between the outer ring 5 and the fixed shaft 10. Consequently, the mounting of the compound ball bearing 4 would become still more complicated and difficult.

Next, a second embodiment of the invention will be described with reference to FIG. 3 and FIG. 4 wherein the parts corresponding to those of the fixed shaft type spindle motor in the first embodiment are given the same symbols.

Figure 3:
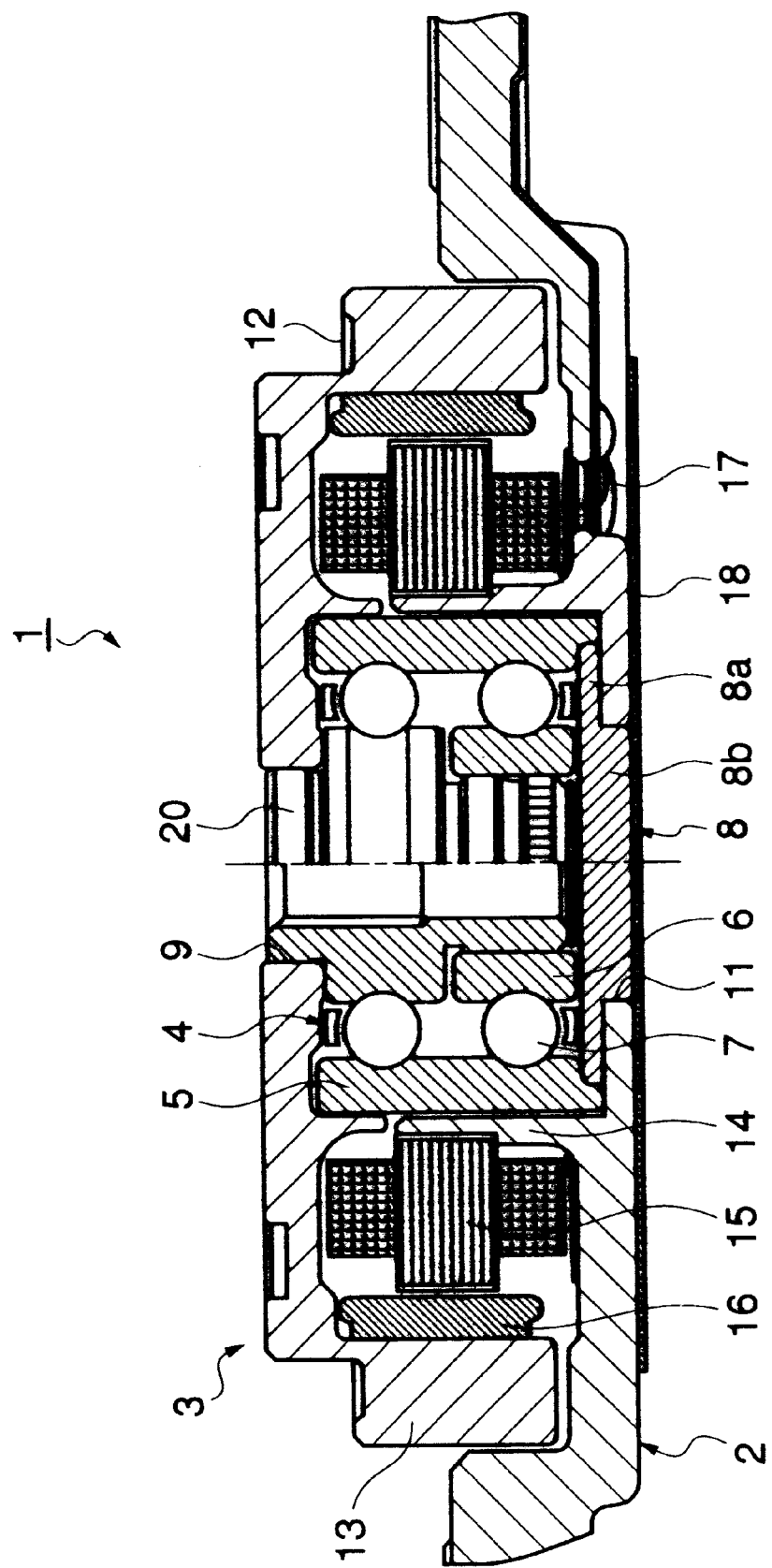
FIG. 3 is a sectional view of a rotary shaft type spindle motor according to a second embodiment of the invention.
Figure 4:
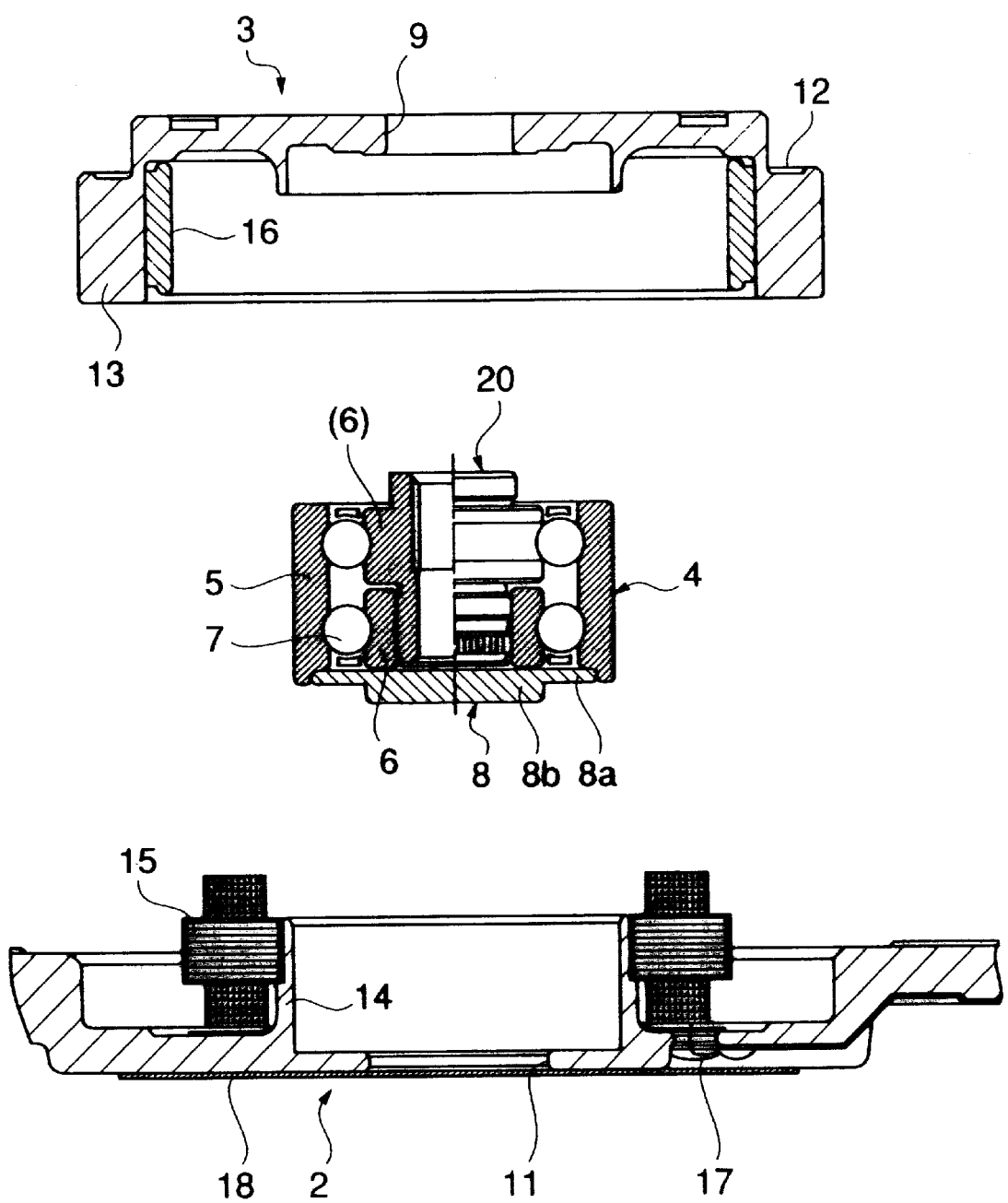
FIG. 4 is an exploded view of the spindle motor of FIG. 3.

As shown in FIG. 3 and FIG. 4, the rotary shaft type spindle motor 1 of the second embodiment has a rotary shaft 20 installed in the rotor hub 3, in which the rotary shaft 20 is fixed withing the central circular hole 9 of the rotor hub 3. The inner ring 6 of the lower half of the compound ball bearing 4 is fixed to the lower reduced diameter portion of the rotary shaft 20 in FIG. 3. The inner ring portion (6) of the upper half of the compound ball bearing 4 is formed integrally with the rotary shaft 20.

The outer ring 5 of the compound ball bearing 4 is formed as a n integral structure which extends the whole length of the compound ball bearing 4. On the lower end of the outer ring 5 is formed a step made by enlarging the inner diameter thereof. The larger diameter portion 8*a* of the stepped connection member 8 is fixed within the step formed on the lower end of the outer ring 5. The smaller diameter portion 8*b* of the connection member 8 is fixed within the central circular hole 11 of the flange base 2. Further, the larger diameter portion 8*a* is seated on an inner surface surrounding the central circular hole 11 of the base 2; however it is not necessarily seated in this manner.

Figure 10:
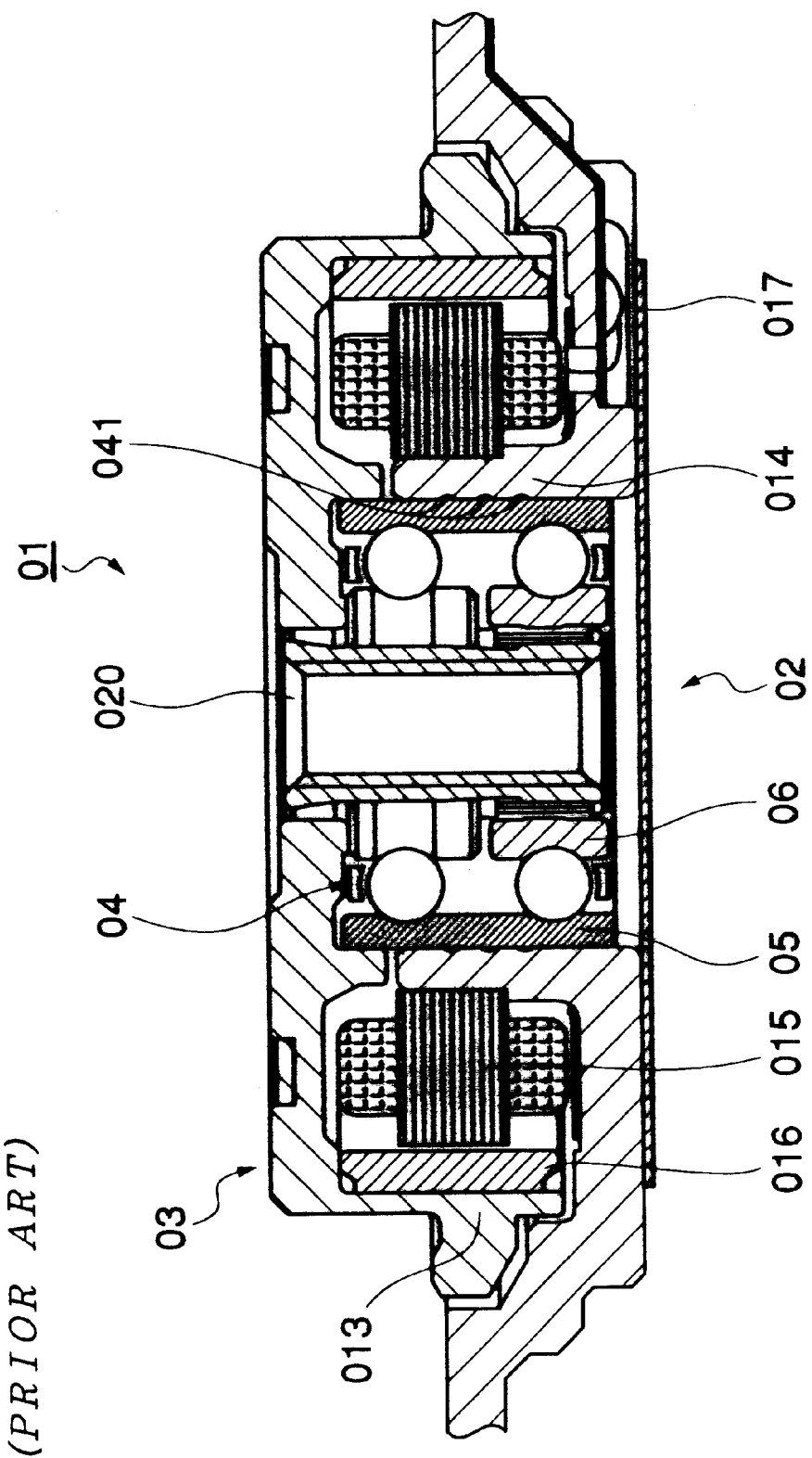
FIG. 10 is a sectional view of a conventional rotary shaft type spindle motor using a compound ball bearing.

Therefore, since the base 2, connection member 8, and the outer ring 5 of the compound ball bearing 4 are coupled into one unit, the base 2 supports the rotary shaft 20 of the rotor hub 3 for free rotation through the connection member 8 and the compound ball bearing 4. Since the outer ring 5 of the compound ball bearing 4 is fixed to the base 2 through the connection member 8, the inner peripheral wall (refer to the inner cylindrical wall 014 of the base 02 in FIG. 10), which has conventionally been regarded as necessary for fitting the outer ring 5 of the compound ball bearing 4 to the base 2, becomes unnecessary. Therefore, the base 2 is not provided with such an inner peripheral wall. The base 2 has the inner cylindrical wall 14 formed upright thereon with an inner peripheral surface facing the outer peripheral surface of the outer ring 5. However, the outer ring 5 is not fixed to this inner peripheral surface of the inner cylindrical wall 14.

In the second embodiment, the rotary shaft 20, the compound ball bearing 4, and the connection member 8 are integrally assembled in advance as a unit, as shown in FIG. 4. With the bearing thus assembled, the projecting end of the rotary shaft 20 thereof is fixed within the central circular hole 9 of the rotor hub 3, and the smaller diameter portion 8*b* of the connection member 8 is fixed within the central circular hole 11 of the base 2, whereby the rotary shaft type spindle motor 1 of the second embodiment is assembled.

The second embodiment is different from the first embodiment in the foregoing particulars, however it is not different in the other internal structure of the compound ball bearing 4, the structure of the motor, and so forth; and the detailed description will be omitted.

With the second embodiment as described above, when the power is supplied from the feeder 17 to the windings of the stator 15, the rotor hub 3 with the permanent magnet 16 starts to rotate as one body with the rotary shaft 20 and the inner ring 6. The base 2 supports the rotary shaft 20 of the rotor hub 3 for free rotation through the connection member 8 and the compound ball bearing 4.

The second embodiment also can be made without the inner peripheral wall which has conventionally been regarded as necessary for fitting the outer ring 5 of the compound ball bearing 4 to the base 2. As a result, the stress resulting from the shape precision (circularity, cylindricality, surface roughness) of the inner peripheral surface of the wall, and the stress caused by the press-fitting, adhesion, or press-fit adhesion as the method of mounting the bearing are eliminated. Accordingly adverse influences on the precision of the rolling surfaces of the inner and outer rings 6, 5 through the outer peripheral surface of the outer ring 5 of the compound ball bearing 4 are eliminated, so that the reliability of the run-out accuracy/NRRO, the noise, and the acoustic life, etc., of the spindle motor 1 can be enhanced.

Further, because the base 2 can be configured without the inner wall which has conventionally been regarded as necessary for fitting the outer ring 5 of the compound ball bearing 4 to the base 2, the adhesion groove and the run-off groove that are formed conventionally on the inner peripheral surface of the wall become unnecessary, which reduces man-hours and the manufacturing cost.

Further, since the compound ball bearing 4, the rotary shaft 20, and the connection member 8 are assembled in advance into one unit, fastening the rotary shaft 20 to the rotor hub 3 and fastening the smaller diameter portion 8b of the connection member 8 to the base 2 achieve assembly of the compound ball bearing 4 between these two counterparts, and thus the mounting of the compound ball bearing 4 becomes extremely easy. In other aspects, the second embodiment exhibits the same effects as those of the bearing assembly of the first embodiment.

Next, a third embodiment of the invention will be described with reference to FIG. 5 and FIG. 6 wherein the parts corresponding to those of the fixed shaft type spindle motor in the first embodiment are given the same symbols.

Figure 5:
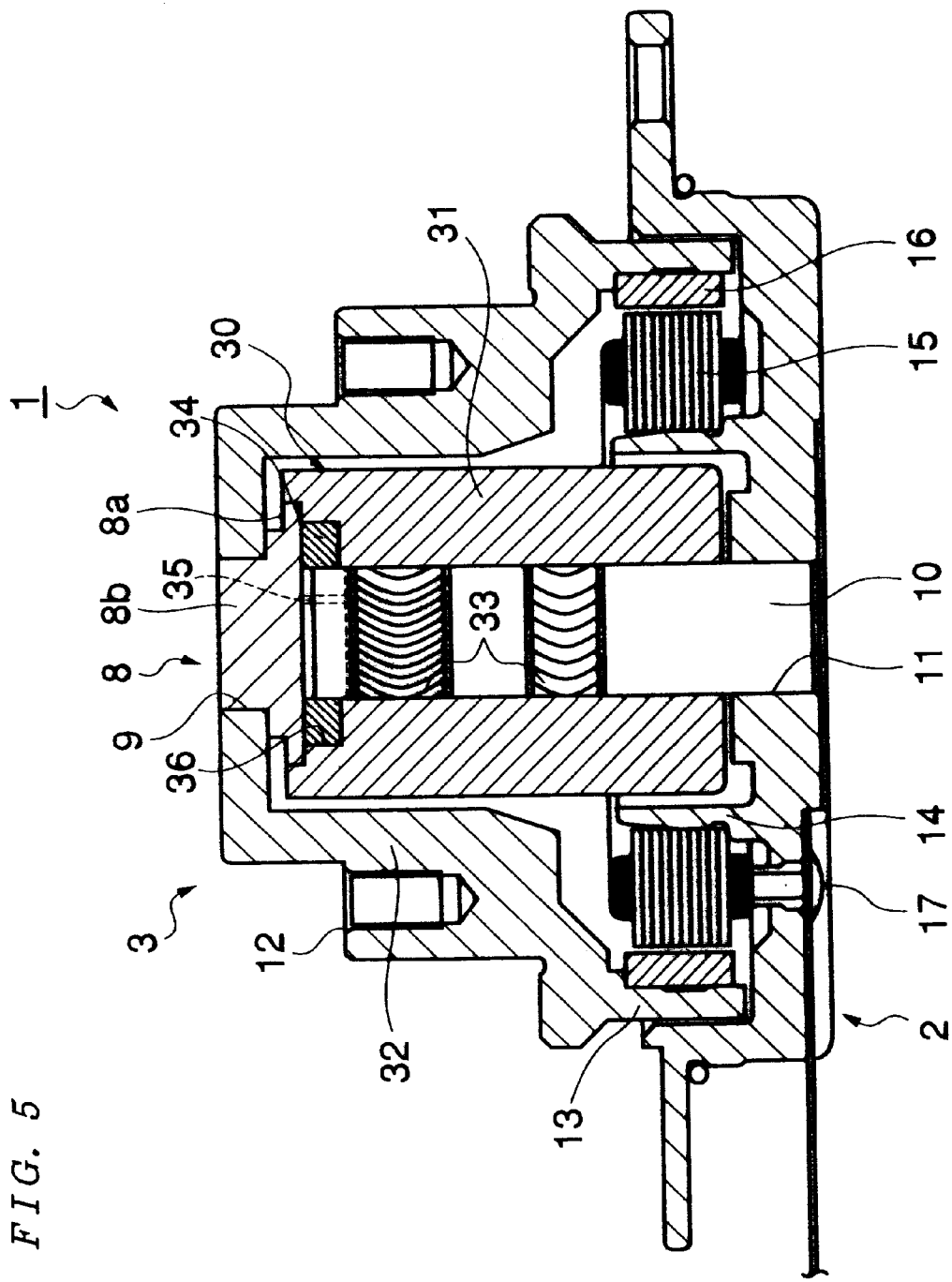
FIG. 5 is a sectional view of a fixed shaft type spindle motor according to a third embodiment of the invention.
Figure 6:
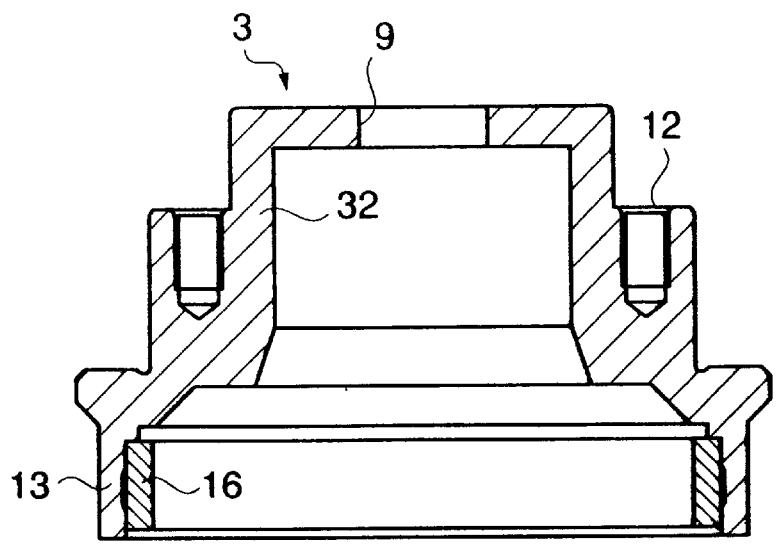
FIG. 6 is an exploded view of the spindle motor of FIG. 5.
Figure 6:
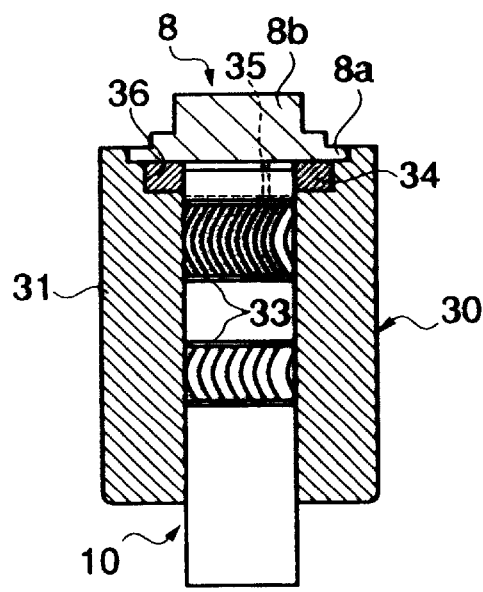
Figure 6:
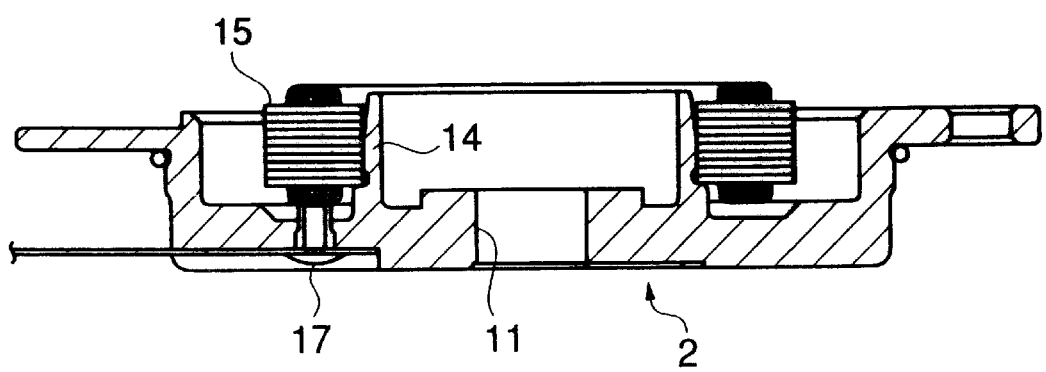

As shown in FIG. 5 and FIG. 6, the fixed shaft type spindle motor 1 of the third embodiment has the fixed shaft 10 installed upright (vertically upward) on the flange base 2, with shaft 10 fixed within the central circular hole 11 on the flange base 2. Also, the fixed shaft 10 is sheathed with a sleeve 31 of a fluid bearing 30.

The sleeve 31 of the fluid bearing 30 is a cylindrical member of a slightly thick wall, and has a step in the upper end thereof, where the inner diameter is enlarged. The larger diameter portion 8a of the stepped connection member 8 is fixed within the internal recess or stepped portion formed in the upper end of the sleeve 31, with the larger diameter portion 8a inserted within the stepped portion. The smaller diameter portion 8b of the connection member 8 is fixed within the central circular hole 9 of the rotor hub 3.

Therefore, since the rotor hub 3, connection member 8, and the sleeve 31 of the fluid bearing 30 are coupled into a single unit, the rotor hub 3 is supported for free rotation by the fixed shaft 10 through the connection member 8 and the fluid bearing 30. And, since the sleeve 31 of the fluid bearing 30 is fixed to the rotor hub 3 through the connection member 8, the inner peripheral wall which has conventionally been regarded as necessary to fit the sleeve 31 of the fluid bearing 30 to the rotor hub 3, becomes unnecessary, so that the rotor hub 3 is not provided with such an inner peripheral surface. The rotor hub 3 has an inner peripheral surface facing the outer peripheral surface of the sleeve 31 of the fluid bearing 30 on the circumferential wall 32 of the central smaller diameter portion thereof. However, the sleeve 31 is not fixed to this inner peripheral surface of the circumferential wall 32.

A magnetic disk (not shown) is mounted on the mounting surface 12 of the rotor hub 3. The other rotating bodies requiring a high run-out accuracy/NRRO and/or low noise can be mounted thereon.

Lubricating oil is introduced into the gap between the sleeve 31 of the fluid bearing 30 and the fixed shaft 10. The fixed shaft 10 has herringbone grooves 33 formed on its outer circumferential surface thereof at two places which are axially separated. As described later, as the rotor hub 3 rotates, the pressure of the lubricating oil in the herringbone grooves 33 rises, whereby the sleeve 31 floats up on the fixed shaft 10. Here, a gaseous lubricant may replace the lubricating oil.

A cylindrical thrust ring 34 is fixed to an upper end of the fixed shaft 10 by press-fitting. The thrust ring 34 is accommodated or seated in an annular space closed on one side by the inner surface of the connection member 8. The annular space is formed as step 36 by enlarging the inner diameter of the upper end of the sleeve 31. When the sleeve 31 rotates integrally with the rotor hub 3, the thrust ring 34 rotates in the annular space relative to the sleeve 31.

Although not detailed in the drawing, herringbones similar to the herringbones 33 formed on the outer circumferential surface of the fixed shaft 10 are formed on an edge surface of the thrust ring 34. Since lubricating oil is supplied into the gap between the edge surface and the inner surface of the connection member 8 that faces the edge surface, as the thrust ring 34 rotates relative to the sleeve 31, the herringbones act to raise the pressure of the lubricating oil, which floats the connection member 8 up from the thrust ring 34 and the fixed shaft 10. In this manner, the thrust force acting on the connection member 8 is received by the fixed shaft 10, finally by the base 2.

Although not detailed in the drawing, herringbones are formed on the lower edge surface of the sleeve 31. And, since the lubricating oil is supplied into the gap between the lower edge surface of the sleeve 31 and the inner surface of the base 2 near the central circular hole 11, as the sleeve 31 rotates integrally with the rotor hub 3, the herringbones formed on the lower edge surface of the sleeve 31 act to raise the pressure of the lubricating oil, which floats the sleeve 31 up from the base 2. In this manner, the base 2 also receives the thrust force acting on the sleeve 31.

The above-described thrust bearing structures may both be used, or one of these may be omitted.

Although not detailed in the drawing, the lubricating oil that lubricates the radial bearing portion (the facing sliding surfaces of the fixed shaft 10 and the sleeve 31) of the fluid bearing 30 and thrust bearing surfaces (the contacting/sliding surfaces of the thrust ring 34 and the connection member 8, and the contacting/sliding surfaces of the sleeve 31 and the base 2) and circulates through these lubricated areas in a closed circulating passage, in a single direction, with the rotation of the sleeve 31.

The stator 15 is mounted on the outer peripheral surface of the inner cylindrical wall 14 of the base 2, and the permanent magnet 16 is mounted on the inner peripheral surface of the outer circumferential wall 13 of the rotor hub 3 so as to face the outer peripheral surface of the stator 15. A feeder 17 for feeding current to the windings of the stator 15 is connected to the flexible printed circuit board 37.

In the third embodiment, the fixed shaft 10, the fluid bearing 30, the connection member 8, and the thrust ring 34 are integrally assembled in advance as a unit, as shown in FIG. 6. With the bearing assembly thus produced, the projecting end of the fixed shaft 10 thereof is fixed within the central circular hole 11 of the base 2, and the smaller diameter portion 8b of the connection member 8 is fixed within the central circular hole 9 of the rotor hub 3, whereby the fixed shaft type spindle motor 1 of the third embodiment is assembled.

In the third embodiment as described above, when the power is supplied from the feeder 17 to the windings of the stator 15, the rotor hub 3 with the permanent magnet 16 starts to rotate as one body with the connection member 8 and the sleeve 31. That is, the rotor hub 3 is borne by the fluid bearing 30 through the connection member 8 for rotation about the fixed shaft 10.

The third embodiment thus configured exhibits the following effects.

In the fixed shaft type spindle motor 1 of the third embodiment also, the inner peripheral wall, which has conventionally been regarded as necessary for fitting the sleeve 31 of the fluid bearing 30 on the rotor hub 3 can be omitted from the rotor hub 3. As a result, the stress which would otherwise result from the shape precision (circularity, cylindricality, surface roughness) of the inner peripheral surface of the wall, and the stress otherwise caused by mounting the bearing are eliminated. Accordingly, adverse influences on the precision of the sliding surfaces of the sleeve 31 and the fixed shaft 10 are eliminated and the clearance between their sliding surfaces is ensured, i.e., is constant, so that the reliability of the run-out accuracy/NRRO, the noise, the acoustic life, and the rigidity, etc., of the spindle motor 1 are enhanced.

Further, because the rotor hub 3 can be configured without the inner peripheral wall which has conventionally been regarded as necessary for fitting the sleeve 31 of the fluid bearing 30 to the rotor hub 3 is eliminated, the adhesion groove and the run-off groove that are conventionally formed on the inner peripheral surface of the wall become unnecessary, which reduces the man-hours and the manufacturing cost.

Further, since the fluid bearing 30, the fixed shaft 10, the connection member 8, and the thrust ring 34 are assembled in advance into one unit, fastening the fixed shaft 10 to the base 2 (being the other one of the two counterparts that mount the bearing assembly therebetween) and fixing the smaller diameter portion 8b of the connection member 8 to the rotor hub 3 serve to assemble the fluid bearing 30 between these two counterparts, and thus the mounting work of the fluid bearing 30 becomes extremely easy to perform. Here, the lubricating oil is introduced after finishing the assembly.

Next, a fourth embodiment of the invention will be described with reference to FIG. 7 and FIG. 8. The parts corresponding to those of the rotary shaft type spindle motor in the second embodiment and those of the fixed shaft type spindle motor in the third embodiment are given the same symbols.

Figure 7:
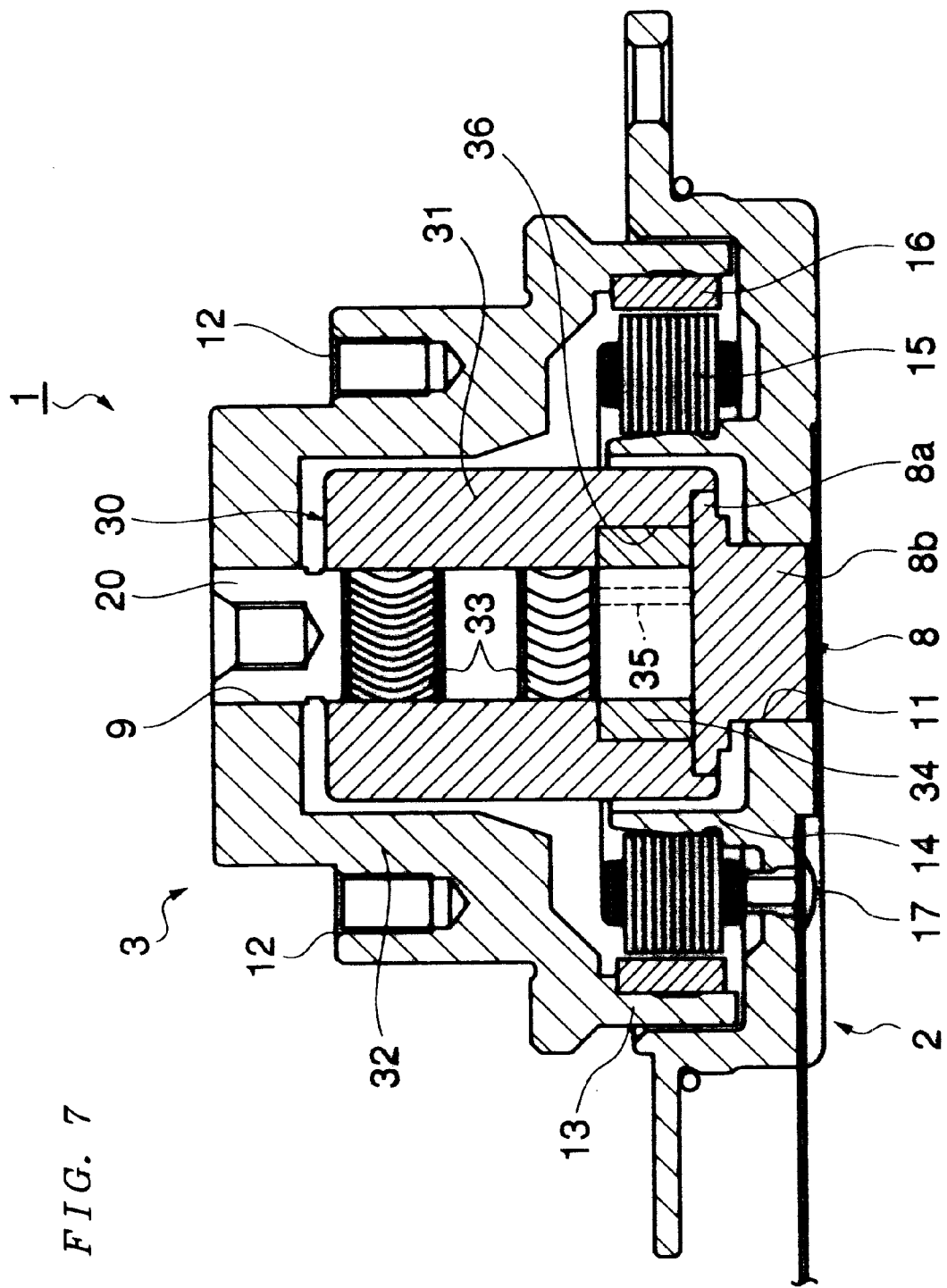
FIG. 7 is a sectional view of a rotary shaft type spindle motor according to a fourth embodiment of the invention.
Figure 8:
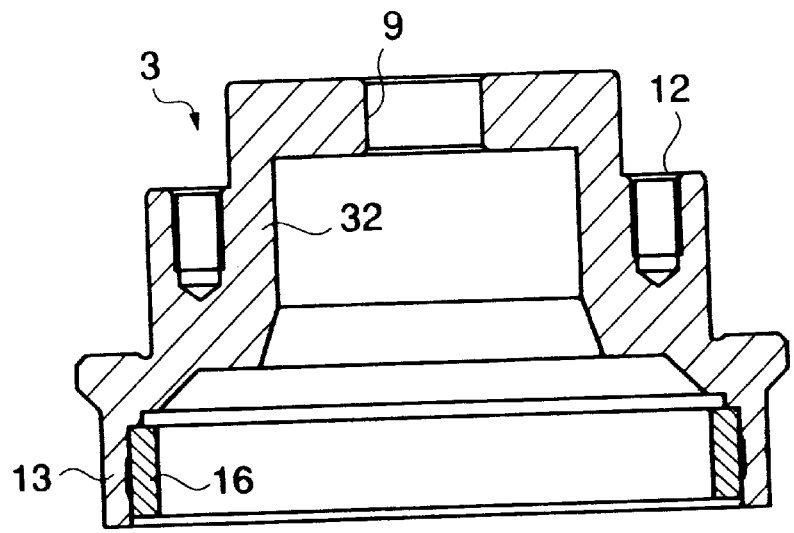
FIG. 8 is an exploded view of the spindle motor of FIG. 7.
Figure 8:
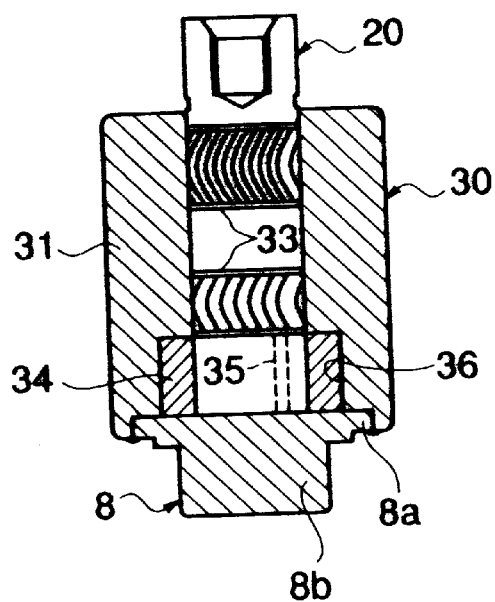
Figure 8:
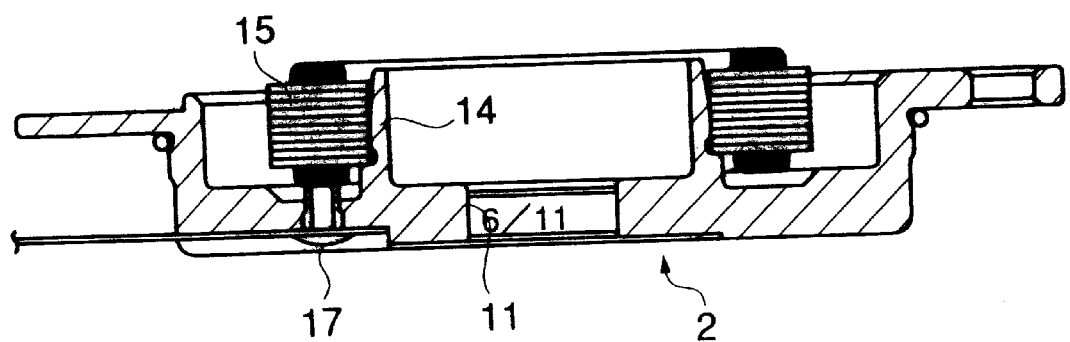

As shown in FIG. 7 and FIG. 8, the rotary shaft type spindle motor 1 of the fourth embodiment has the rotary shaft 20 fixed withing the central circular hole 9 on the rotor hub 3. Also, the rotary shaft 20 is sheathed with the sleeve 31 of the fluid bearing 30.

The sleeve 31 of the fluid bearing 30 is a cylindrical member of a slightly thick wall, and has a step formed in the lower end thereof, which is made by enlarging the inner diameter. The larger diameter portion 8a of the stepped connection member 8 is fixed withing the step formed in the lower end of the sleeve 31. The smaller diameter portion 8b of the connection member 8 is fixed withing the central circular hole 11 of the base 2.

Figure 11:
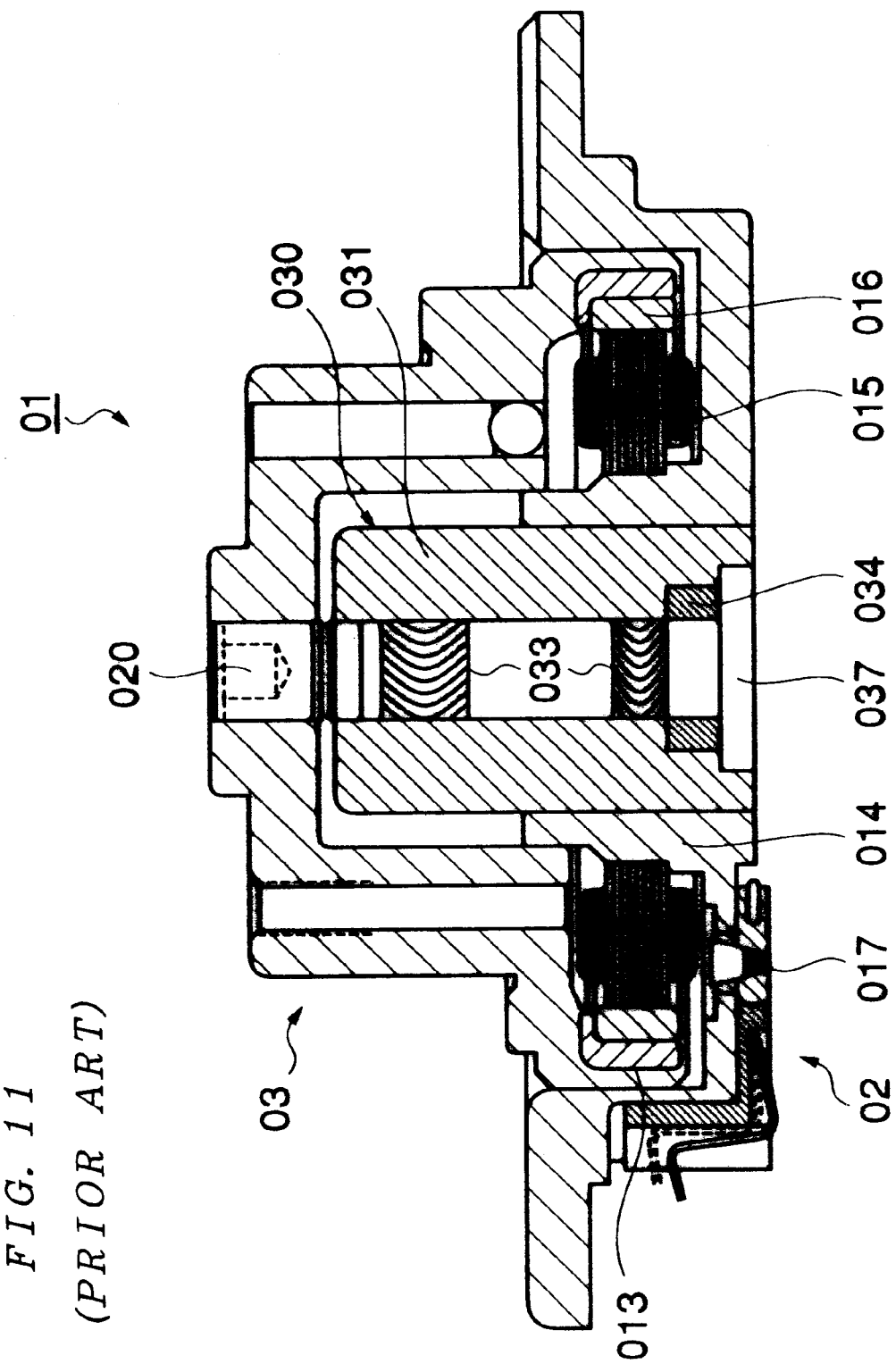
FIG. 11 is a sectional view of a conventional rotary shaft type spindle motor using a fluid bearing.

Therefore, since the base 2, connection member 8, and the sleeve 31 of the fluid bearing 30 are coupled into one unit, the base 2 supports the rotary shaft 20 of the rotor hub 3 for free rotation through the connection member 8 and the sleeve 31 of the fluid bearing 30. And, since the sleeve 31 of the fluid bearing 30 is fixed to the base 2 through the connection member 8, the inner peripheral wall (refer to the inner peripheral surface of the inner cylindrical wall 014 of the base 02 in FIG. 11), which has conventionally been regarded as necessary for fitting the sleeve 31 of the fluid bearing 30 to the base 2, becomes unnecessary and is omitted. The base 2 has the inner cylindrical wall 14 formed upright thereon, and the cylindrical wall 14 has an inner peripheral surface facing the outer peripheral surface of the sleeve 31. However, the sleeve 31 is not fixed to this inner peripheral surface of the cylindrical wall 14.

The cylindrical thrust ring 34 is fixed on a lower end of the rotary shaft 20 by press-fitting. The thrust ring 34 is accommodated in an annular space closed on one side by the inner surface of the connection member 8 and formed as a step portion 36 by enlarging the inner diameter of the lower end of the sleeve 31. When the rotary shaft 20 rotates, the thrust ring 34 rotates in the annular space integrally with the rotary shaft 20.

Although not detailed in the drawing, herringbones similar to the herringbones 33 formed on the outer circumferential surface of the rotary shaft 20 are formed on the edge surface of the thrust ring 34. And, since the lubricating oil is supplied into a gap between the edge surface and the inner surface of the connection member 8 that faces the edge surface, as the thrust ring 34 rotates integrally with the rotary shaft 20, the herringbones raise the pressure of the lubricating oil, which floats the rotary shaft 20 and the thrust ring 34 up from the inner surface of the connection member 8. In this manner, the thrust force acting on the rotary shaft 20 is received.

Although not detailed in the drawing, the lubricating oil that lubricates the radial bearing portion (the interface between the rotary shaft 20 and the sleeve 31) of the fluid bearing 30 and the thrust bearing portion (the interface between the thrust ring 34 and the connection member 8) circulates between these interfaces through a closed circulating passage, in a single direction, with the rotation of the rotary shaft 20. A through hole 35 forms a part of the passage.

In the fourth embodiment, the rotary shaft 20, the fluid bearing 30, the connection member 8, and the thrust ring 34 are integrally assembled in advance as a unit, as shown in FIG. 8. With the bearing unit thus produced, the projecting end of the rotary shaft 20 thereof is fixed withing the central circular hole 9 of the rotor hub 3, and the smaller diameter portion 8b of the connection member 8 is fixed within the central circular hole 11 of the base 2, whereby the rotary shaft type spindle motor 1 of the fourth embodiment is assembled.

The fourth embodiment is different from the third embodiment in terms of the foregoing features, however in other respects it is no different from the other, previously described embodiments, and a detailed description of such other features will be omitted.

In the fourth embodiment, when the power is supplied from the feeder 17 to the windings of the stator 15, the rotor hub 3 with the permanent magnet 16 starts to rotate as one body with the rotary shaft 20. The base 2 supports the rotary shaft 20 of the rotor hub 3 for free rotation through the connection member 8 and the fluid bearing 30.

In the fourth embodiment also, because the inner peripheral wall which has conventionally been regarded as necessary for fitting the sleeve 31 of the fluid bearing 30 to the base 2 is omitted, the stress resulting from the shape precision (circularity, cylindricality, surface roughness) of the inner peripheral surface of the wall, and the stress caused by the press-fitting, adhesion, or press-fit adhesion in mounting the bearing are eliminated, adverse influences on the precision of the sliding surfaces of the sleeve 31 and the rotary shaft 20 are eliminated and the clearance between these sliding surfaces is ensured to remain at a constant quantity, so that the reliability of the run-out accuracy/NRRO, the noise, the acoustic life, and the rigidity, etc., of the spindle motor 1 are enhanced.

Further, because the base 2 can be configured without the inner peripheral wall which has conventionally been regarded as necessary for fitting the sleeve 31 of the fluid bearing 30 to the base 2 the adhesion groove and the run-off groove that are conventionally formed on the inner peripheral surface of the wall become unnecessary, which reduces the man-hours and lowers the manufacturing cost.

Further, since the fluid bearing 30, the rotary shaft 20, the connection member 8, and the thrust ring 34 are assembled in advance into a single unit, fastening the rotary shaft 20 to the rotor hub 3 (to form one of the two counterparts) and fixing the smaller diameter portion 8b of the connection member 8 to the base 2 (the other counterpart) will serve to assemble the fluid bearing 30 between these two counterparts, and thus the mounting work of the fluid bearing 30 becomes extremely easy to perform. Here, the lubricating oil is introduced after finishing the assembling.

In the first through fourth embodiments, it is assumed that the bearing assemblies are each incorporated into spindle motors; however, they can also be applied to various other rotating machines that require a high run-out accuracy/NRRO and/or low noise.

As many widely different embodiments of the present invention can be made without departing from the spirit and scope thereof, it is to be understood that the invention is not limited to the specific embodiments described above except as defined in the appended claims.

What is claimed is:

1. A fluid bearing assembly comprising:

a sleeve sheathing a shaft;

a cylindrical connector having an outer cylindrical surface which is stepped to form a first diameter portion and a second diameter portion having a diameter smaller than said first diameter portion, one of said first and second diameter portions being fixed to said sleeve; and a member having an aperture receiving and fixing the other of said first and second diameter portions, to provide for relative rotation between said member and said shaft.

2. A fluid bearing assembly according to claim 1 wherein said shaft is fixed and said member, said connector and said sleeve are rotatable, as one integral unit, around said shaft.

3. A fluid bearing assembly according to claim 1 wherein said cylindrical connector has at least two steps in its outer cylindrical surface forming said first diameter portion, said second diameter portion and a third diameter portion located between said first and second diameter portions, thereby providing axial spacing between said sleeve and said member.

4. A fluid bearing assembly according to claim 1 wherein one end of said sleeve has a cylindrical recess, said first diameter portion being fitted within said recess.

5. A fluid bearing assembly according to claim 1 wherein said member is a hub including a planar, circular plate having said aperture centered therein and a skirt integral with the periphery of said plate and extending perpendicular from said plate along a central axis defined by said shaft.

6. A fluid bearing assembly according to claim 1 wherein said member, said connector and said sleeve are fixed, as one integral unit, and said shaft is rotatably supported by said sleeve.

7. A fluid bearing assembly according to claim 1 wherein said first diameter portion is fixed to said sleeve.

8. A fluid bearing assembly according to claim 2 wherein said first diameter portion is fixed to said sleeve.

9. A fluid bearing assembly according to claim 6 wherein said first diameter portion is fixed to said sleeve.

* * * * *